Aug. 9, 1932.     C. S. BROWN     1,871,149

ROLLER BEARING CONSTRUCTION

Filed April 23, 1930

INVENTOR.
Charles S. Brown
BY
Bodell & Thompson.
ATTORNEYS

Patented Aug. 9, 1932

1,871,149

UNITED STATES PATENT OFFICE

CHARLES S. BROWN, OF SYRACUSE, NEW YORK

ROLLER BEARING CONSTRUCTION

Application filed April 23, 1930. Serial No. 446,674.

This invention relates to roller bearings and has for its object a roller bearing, which is particularly simple and economical in construction and consists of a minimum number of parts.

The invention consists in the novel features and in the combinations and constructions hereinafter set forth and claimed.

In describing this invention, reference is had to the accompanying drawing in which like characters designate corresponding parts in all the views.

Figures 1, 2:
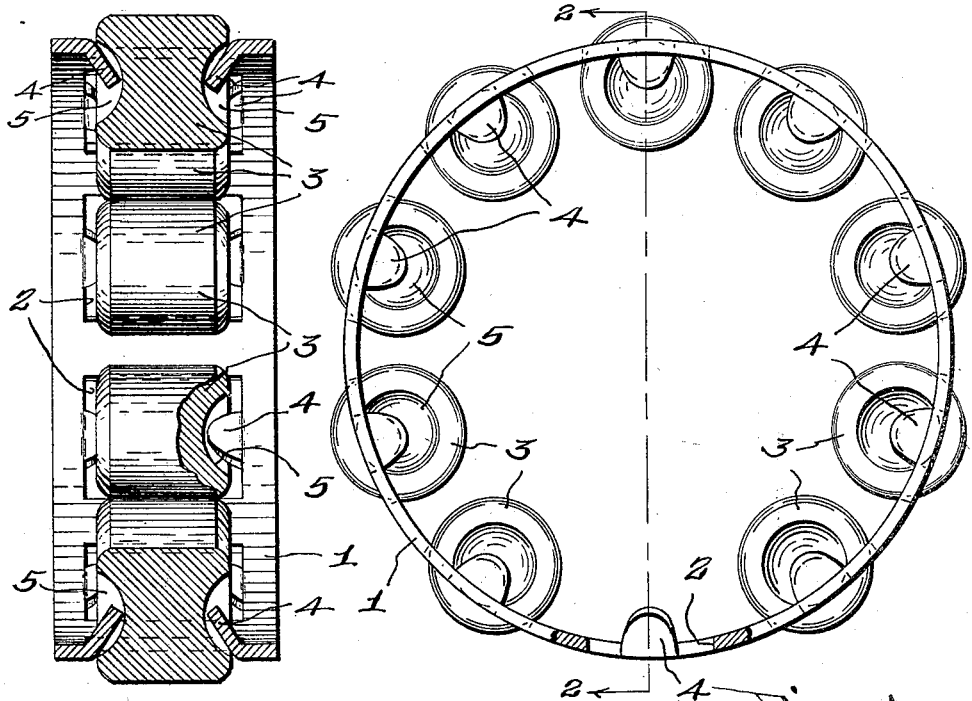
Figure 1 is an elevation, partly broken away and parts being removed, of this roller bearing.
Figure 2 is a sectional view on line 2—2, Figure 1.

1 designates the cage of the bearing, which comprises a cylindrical wall or band formed with roller receiving slots 2 terminating short of the opposite side edges of the cylindrical wall or band.

3 designates the rollers. The rollers are held in the cage by means extending inwardly from the ends of the slots toward the axis of the ring and coacting with the ends of the rollers, this means being here shown as lugs 4, and as the lugs extend from the ends of the slots, they are set in from the outer edges of the band or cylindrical wall 1.

As here illustrated, the means at the ends of the rollers with which the lugs coact are the walls of the recesses 5 formed in the ends of the rollers. The walls of the recesses are preferably spherical and the lugs 4 extend obliquely into the recesses and thus hold the rollers from displacement and the end edges are arcuate to conform to the spherical walls of the recesses.

The cylindrical wall or band may be formed in any suitable manner. It is usually formed of sheet metal and the lugs are formed integral therewith and are normally arranged at substantially a right angle to the band or cylindrical wall 1, as shown in Figure 3, in order to permit the rollers to be inserted through the slots, preferably from the inner side of the cylindrical wall or band 1, as the slots 2 are of less width than the diameter of the rollers.

Figure 3:
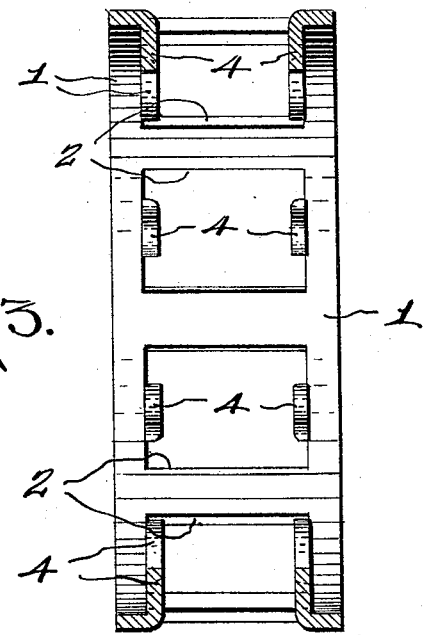
Figure 3 is a cross sectional view through the cage, the rollers being removed and before the roller receiving means is placed in final position.

After the rollers are inserted, the lugs are forced from the position shown in Figure 3 into that shown in Figure 2 where they loosely take into the cylindrical recesses 5 at the ends of the rollers.

When the cage with the rollers is placed on a shaft or other part to be provided with a bearing, the rollers are forced radially outwardly slightly so that the lugs are near the center or axis of the roller, as shown in Figures 1 and 2. In other words, before the bearing is placed on a shaft, the rollers hang on the lugs, but when the bearing is in position on a shaft or other element, the rollers are supported, insofar as radial position is concerned, by the shaft and have a freedom of movement necessary to roll in a raceway.

What I claim is:

A roller bearing construction comprising a cage, and an annular series of rollers held in the cage, the cage comprising a cylindrical band having roller receiving slots, and having lugs at the ends of the slots extending inwardly toward the axis of the bearing the lugs being inclined out of the cylinder of the band and also out of planes radial to the axis of the band, and coacting with the ends of the rollers to hold the rollers from displacement, the cage being open at its ends between the lugs, all whereby the cage consists of the cylindrical band, and spaced apart inwardly converging extending lugs at the end of the roller receiving slots.

In testimony whereof, I have hereunto signed my name, at Syracuse, in the county of Onondaga, and State of New York, this 21st day of April, 1930.

CHARLES S. BROWN.